United States Patent [19]

Lenkov et al.

[11] Patent Number: 5,361,351
[45] Date of Patent: Nov. 1, 1994

[54] SYSTEM AND METHOD FOR SUPPORTING RUN-TIME DATA TYPE IDENTIFICATION OF OBJECTS WITHIN A COMPUTER PROGRAM

[75] Inventors: Dmitry Lenkov; Shankar Unni; Michey Mehta, all of San Jose, Calif.; Mark W. McDowell, Fort Collins, Colo.; Manoj Dadoo, San Jose, Calif.; Bruno Melli, Fort Collins, Colo.

[73] Assignee: Hewlett-Packard Company, Palo Alto, Calif.

[21] Appl. No.: 586,778

[22] Filed: Sep. 21, 1990

[51] Int. Cl.$^5$ ............................................. G06F 11/00
[52] U.S. Cl. .................................. 395/700; 395/650; 364/943.9; 364/944.5; 364/945.5; 364/949.5
[58] Field of Search ............................................ 395/700

[56] References Cited

U.S. PATENT DOCUMENTS

| | | | |
|---|---|---|---|
| 4,373,697 | 2/1983 | Phelps ................................... | 251/129 |
| 4,667,290 | 5/1987 | Goss et al. ............................ | 364/300 |
| 4,712,189 | 12/1987 | Mohri ................................... | 364/900 |
| 4,845,975 | 7/1989 | Kyrtos et al. ......................... | 73/11 |
| 4,931,928 | 6/1990 | Greenfield ........................... | 364/300 |
| 5,093,914 | 3/1992 | Coplien et al. ....................... | 395/700 |

OTHER PUBLICATIONS

Reiss, Steven P.; "PECAN: Program Development Systems that Support Multiple Views"; IEEE Transactions on Software Engineering SE-11 (1985) No. 3.
Lewis II, Rosencrantz, Stearns; "Compiler Design Theory", Addison-Wesley; 1976.
Walker, et al.; "The Symbolics General Programming Environment", IEEE Software 4; 1987, No. 6.
Spencer, Donald; *Computer Dictionary*; Camelot Publishing Company; 1993.
Reiss; "Graphical Program Development with PECAN Development Systems"; 1984.
Reiss; "An Approach to Incremental Compilation", SIGPLAN Notices; 1984.

Employees of Borland International, Inc.; *Turbo Pascal*; Borland International; 1990.
Alfred V. Aho, et al.: 'Compilers: Principles, Techniques, and Tools' 1986, Addison–Wesley Publishing Co., Reading, Mass. US pp. 10-15, 33-40, 279-293.
Usenix Technical Conference Winter 1986, Denver Colorado US pp. 62-71 T. A. Cargill: 'The feel of Pi'. Systems and Computers in Japan vol. 18, No. 2, Feb. 1987, New York U.S. pp. 77-88 Hideaki Tsubotani et al: 'Cunstruction of a Software Development Environment Based on a High–Level Language Architecture'. Software Practice & Experience vol. 17, No. 8, Aug. 1987, Chichester GB pp. 503-512 Stephen C. Dewhurst: 'Flexible Symbol Table Structures for Compiling C++'.

*Primary Examiner*—Gareth D. Shaw
*Assistant Examiner*—Jonathan Backenstose
*Attorney, Agent, or Firm*—Roland I. Griffin; Alan H. Haggard

[57] ABSTRACT

The present invention is directed to computer software compilation systems and methods which support run-time data type identification of objects in computer programming languages which support polymorphism. The present invention comprises translators, compilers, and debuggers. The compiler and translator store modified debug information in an object code file. The modified debug information contains information regarding either multiple virtual tables or concatenated virtual tables. A debug lookup table is constructed from the modified debug information. The debugger uses the debug lookup table to determine the actual data types of the objects, and to completely and accurately display and modify the objects' contents. Also, innovative type inquiry operators reference the concatenated virtual tables to determine the actual data types of the objects during run-time. The operation of the compiler, translator, and debugger is transparent to computer programmers and operators. Therefore, the compiler, translator, and debugger support run-time data type identification of the objects in the computer programs in a user-friendly and error-free manner.

23 Claims, 14 Drawing Sheets

SYSTEM AND METHOD FOR SUPPORTING RUN-TIME DATA TYPE IDENTIFICATION OF OBJECTS WITHIN A COMPUTER PROGRAM

BACKGROUND OF THE INVENTION

The present invention relates to computer software compilation systems and methods which support run-time data type identification of instantiations of classes. In this patent document, instantiations of classes are also called objects.

Specifically, the present invention relates to computer software compilation systems and methods which support run-time data type identification of objects in computer programming languages which support polymorphism. Polymorphism is the ability to call a variety of functions using exactly the same interface. The present invention is adapted and intended to operate with computer programming languages (such as C++) which use derived classes and virtual functions to implement polymorphism, where virtual function calls are implemented as indirect function calls through tables of function addresses generated by compilers. Such tables are called virtual tables.

This patent document often refers to a C++ computer programming language to illustrate the features, structure, and operation of the present invention. This patent document also refers to the C++ computer programming language to describe the background of the present invention.

However, the references to the C++ computer programming language are included in this patent document for illustrative purposes only. The present invention is not limited to the C++ computer programming language. Rather, the present invention is adapted and intended to operate with computer programming languages which support polymorphism and which use virtual tables to store virtual member function addresses. The C++ computer programming language is an example of such a computer programming language.

Conventional C++ translators, compilers, and debuggers do not support run-time data type identification of objects in computer programs. In other words, accurate data type information for the objects in the computer programs which are produced using the conventional C++ translators and compilers is not available at run-time. Consequently, the conventional C++ debuggers are not adapted to extract and utilize the accurate, run-time data type information for the objects in the computer programs which are produced using the conventional C++ translators and compilers.

The unavailability of such data type information during run-time limits the functionality of the debuggers. For example, without access to such data type information during run-time, the debuggers cannot reliably refer to pointers and reference variables to determine and use the actual data types of the objects (where the pointers and reference variables point to the objects). Also, the debuggers cannot reliably use the pointers and reference variables to completely and accurately display the objects' contents.

Also, the availability of such data type information during run-time could be used as the basis for providing innovative type inquiry operators in languages such as C++. Such operators would be useful when writing code which needs to identify the exact data types of the objects.

The problem identified above is described below in greater detail with reference to FIGS. 1 and 2.

Referring first to FIG. 1, suppose the statements in Table 1, below, are found in a C++ computer program.

TABLE 1

```
class ANIMAL {
public:
    virtual int x( );
    virtual int y( );
};
ANIMAL *dog_ptr = new ANIMAL;
ANIMAL *horse_ptr = new ANIMAL;
int i;
i = (*dog_ptr).x( );
```

ANIMAL is declared as a class having two virtual member functions, x() and y(). A dog_ptr 136 and a horse_ptr 134 are declared as pointers to type ANIMAL. The dog_ptr 136 and horse_ptr 134 are assigned to point to objects 124, 122, respectively, of type ANIMAL.

FIG. 1 graphically presents an object code representation 102 of the class and pointer declarations and the object instantiations from Table 1. The object code representation 102 is generated by the conventional C++ translators and compilers.

As shown in FIG. 1, the object code representation 102 includes a member function x() code segment 106 and a member function y() code segment 108. The object code representation 102 also includes a virtual table 104 which is associated with the class ANIMAL. Generally, virtual tables are associated with classes that contain virtual member functions.

The virtual table 104 includes an entry 110, 112 for the member function y() and an entry 114, 116 for the member function x(). Generally, virtual tables associated with a class include one entry for each member function in the class.

The entry 110, 112 for the member function y() includes a field 112 that contains a pointer 118 to the member function y() code segment 108. The pointer 118 represents a virtual member function address of the member function y() code segment 108. The entry 110, 112 also includes a field 110 that contains information related to calling the member function y() code segment 108.

The entry 114, 116 for the member function x() includes fields 114, 116 that are analogous to those of the entry 110, 112 for the member function y().

The objects 122, 124 of the type ANIMAL include self-descriptive information. The self-descriptive information includes virtual table address fields 126, 128, respectively. The virtual table address fields 126, 128 contain virtual table addresses 130, 132, respectively, which point to the virtual table 104 associated with the class ANIMAL. Generally, objects of the same class contain virtual table addresses which point to the same virtual table.

In Table 1, the statement i=(*dog_ptr).x();

calls the member function x() associated with the object 124 pointed to by the dog_ptr 136 (and also associated with the ANIMAL class) and assigns the integer returned by x() to a variable i. The member function x() code segment 106 is accessed via the pointer 120 in the virtual table 104. The virtual table 104 is accessed via the virtual table address in the object 124. The object 124 is accessed via the dog_ptr 136.

Referring now to FIG. 2, suppose the statements in Table 2, below, are found in the C++ computer program.

TABLE 2

```
class ONE {
    public:
        int I1;
        virtual int mem_1( );
};
class TWO {
    public:
        int I2;
        virtual int mem_2( );
};
class Three: public ONE, public TWO {
    int I3;
};
THREE *Ptr3 = new THREE;
```

ONE is declared as a class having a data member I1 and a virtual member function mem_1(). Similarly, TWO is declared as a class having a data member I2 and a virtual member function mem_2(). THREE is a derived class of the ONE and TWO classes and has a data member I3.

A Ptr3 226 is declared as a pointer to the class THREE and is assigned to point to an object 202 of the class THREE.

FIG. 2 graphically presents an object code representation 102 of the statements from Table 2. Specifically, FIG. 2 graphically presents an internal layout of the instantiated object 202 of the class THREE. The object code representation 102 is generated by the conventional C++ translators and compilers.

As shown in FIG. 2, the object 202 includes the data members I1 206, I2 210, and I3 214. The object 202 also includes a virtual table address field 208 which contains a virtual table address 220 of a virtual table 216. The object 202 also includes a virtual table address field 212 which contains a virtual table address 222 of a virtual table 218. The virtual tables 216, 218 are similar to the virtual table 104 shown in FIG. 1.

Since the Ptr3 226 is declared as a pointer to the class THREE, the debugger and the innovative type inquiry operators can use the Ptr3 226 to determine the actual data type of the object 202. Also, since the Ptr3 226 points to the beginning of the object 202, the debugger can use the Ptr3 226 to completely and accurately display the contents of the object 202.

Instead of containing the statement,

THREE *Ptr3=new THREE;

suppose Table 2 contained the statement,

ONE *Ptr1=new THREE;

This new statement declares a Ptr1 224 as a pointer to the class ONE. However, this statement assigns the Ptr1 224 to point to the object 202 of the class THREE.

As shown in FIG. 2, because Ptr1 224 points to the beginning of the object 202, the debugger can use the Ptr1 224 to completely and accurately display the contents of the object 202. However, because Ptr1 224 is declared as a pointer to the class ONE, the debugger and the innovative type inquiry operators cannot use the Ptr1 224 to determine the actual data type of the object 202.

Instead of containing the statement,

ONE *Ptr1=new THREE;

suppose Table 2 contained the statement,

TWO *Ptr2=new THREE;

This new statement declares a Ptr2 228 as a pointer to the class TWO. However, this statement assigns the Ptr2 228 to point to the object 202 of the class THREE.

As shown in FIG. 2, because Ptr2 228 is declared as a pointer to the class TWO, the debugger and the innovative type inquiry operators cannot use the Ptr2 228 to determine the actual data type of the object 202. Also, because Ptr2 228 does not point to the beginning of the object 202, the debugger cannot use the Ptr2 228 to completely and accurately display the contents of the object 202.

Therefore, as illustrated in FIGS. 1 and 2 and as described above, the conventional C++ translators, compilers, and debuggers are inadequate in that they do not support run-time data type identification of objects in computer programs.

Prior approaches for solving such inadequacies of the conventional C++ translators, compilers, and debuggers involve explicit user intervention. Under these prior approaches, computer programmers are required to modify class declarations in the computer programs by adding additional members to the class declarations. The additional members are used to store the actual data types of the objects. Specifically, by operation of external tools, predefined virtual member functions, or the conventional C++ compiler, the actual data types of the objects are stored in the additional members. Consequently, data type identification of the objects during run-time is possible by referring to the additional members.

The prior approaches, however, are faulty in that they are not transparent to the computer programmers. Also, since the computer programmers are required to explicitly modify the class declarations, the prior approaches are laborious and error-prone.

SUMMARY OF THE INVENTION

The present invention is directed to software compilation systems and methods which support run-time data type identification of objects in computer programs.

Specifically, the present invention is directed to computer software compilation systems and methods which support run-time data type identification of objects in computer programming languages which support polymorphism. Polymorphism is the ability to call a variety of functions using exactly the same interface. The present invention is adapted and intended to operate with computer programming languages (such as C++) which use derived classes and virtual functions to implement polymorphism, where virtual function calls are implemented as indirect function calls through tables of function addresses generated by compilers. Such tables are called virtual tables.

The present invention comprises improved translators, improved compilers, and improved debuggers.

The present invention comprises a first approach and a second approach for supporting run-time data type identification of the objects in the computer programs.

According to the first approach, the improved compiler and translator store modified debug information in an object code file. The modified debug information contains information regarding multiple virtual tables. A debug lookup table is constructed from the modified debug information. The improved debugger uses the debug lookup table to determine the actual data types of the objects, and to completely and accurately display the objects' contents. Also, the innovative type inquiry operators reference the debug lookup table to determine the actual data types of the objects during run-time.

According to the second approach, which is an improvement upon the first approach in terms of efficiency, the improved compiler and translator create concatenated virtual tables. As with the first approach, the improved compiler and translator store modified debug information in the object code file. The modified debug information contains information regarding the concatenated virtual tables. As with the first approach, the debug lookup table is constructed from the modified debug information. The improved debugger uses the debug lookup table to determine the actual data types of the objects, and to completely and accurately display the objects' contents. The innovative type inquiry operators reference the concatenated virtual tables to determine the actual data types of the objects during run-time.

The operation of the compiler, translator, and debugger according to the first and second approaches of the present invention (as briefly described above) is transparent to computer programmers and operators. Therefore, the compiler, translator, and debugger support run-time data type identification of the objects in the computer programs in a user-friendly and error-free manner.

A better appreciation of these and other advantages and features of the present invention, as well as how the present invention realizes them, will be gained from the following detailed description and drawings of the various embodiments, and from the claims.

BRIEF DESCRIPTION OF THE DRAWINGS

The present invention will be described with reference to the accompanying drawings, wherein:

In FIG. 4, rectangles represent software modules/processes and ovals represent the inputs and outputs of the software modules/processes.

In FIG. 5, rectangles represent software modules/processes and ovals represent the inputs and outputs of the software modules/processes.

In FIG. 6, rectangles represent software modules/processes and ovals represent the inputs and outputs of the software modules/processes.

In FIG. 7, rectangles represent software modules/processes and ovals represent the inputs and outputs of the software modules/processes.

DETAILED DESCRIPTION OF THE PREFERRED EMBODIMENTS

1.0. Overview of the Present Invention

Figure 1:
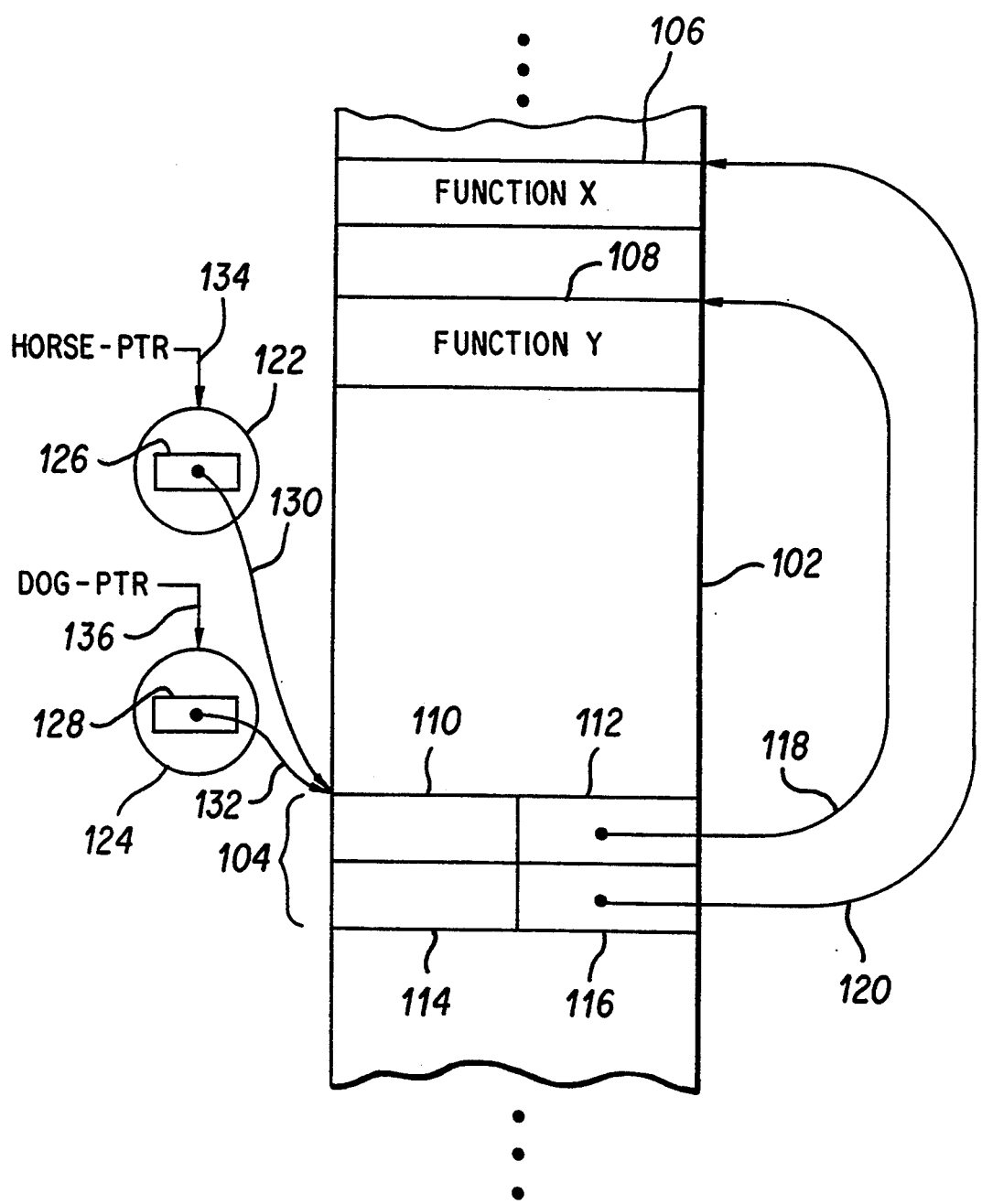
FIG. 1 shows a virtual table for base classes.
Figure 2:
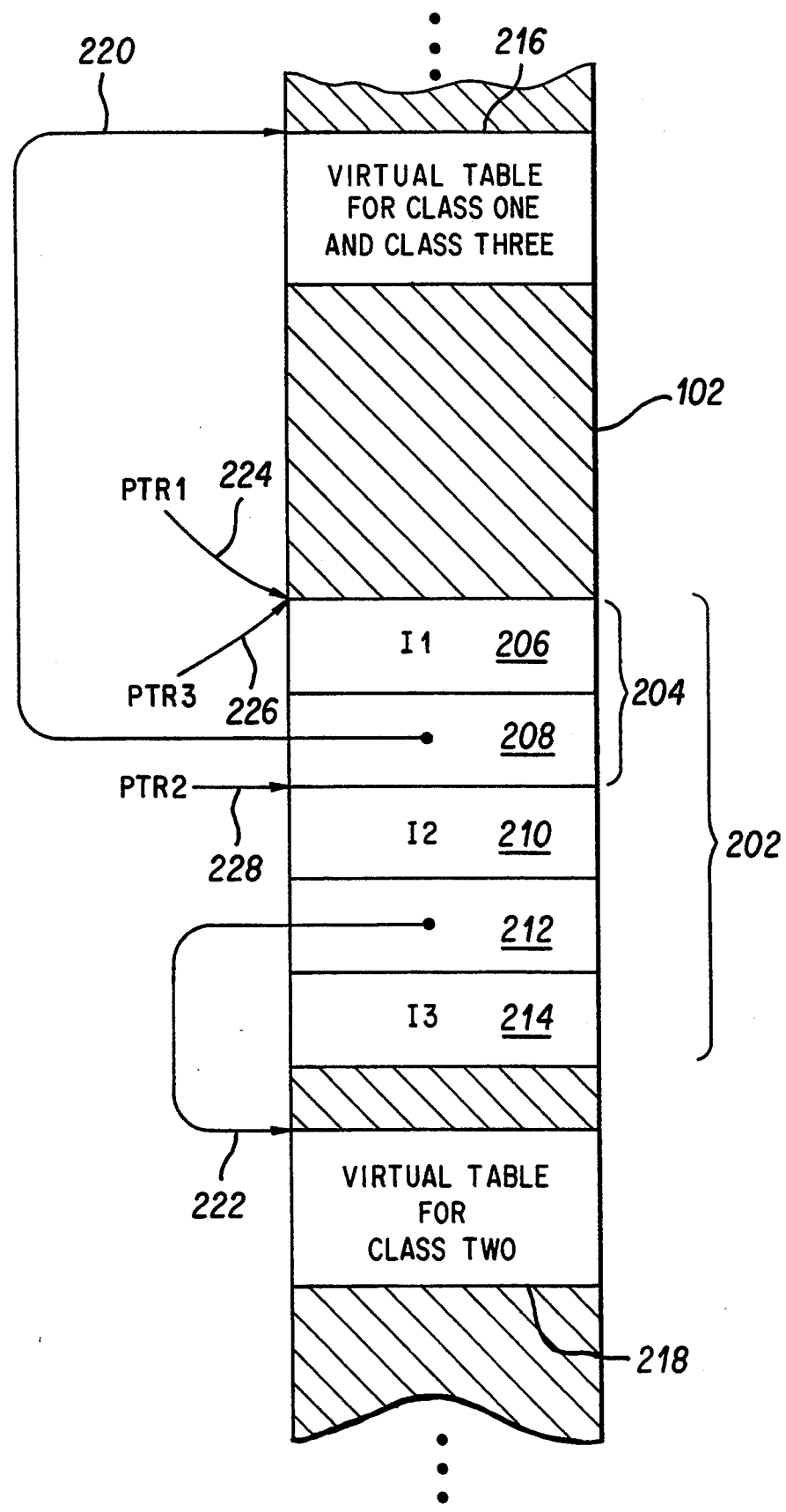
FIG. 2 shows a virtual table for base classes and derived classes.

The present invention 328 is directed to software compilation systems and methods which support run-time data type identification of objects in computer programs 402.

Specifically, the present invention is directed to computer software compilation systems and methods which support run-time data type identification of objects in computer programming languages which support polymorphism. Polymorphism is the ability to call a variety of functions using exactly the same interface. The present invention is adapted and intended to operate with computer programming languages (such as C++) which use derived classes and virtual functions to implement polymorphism, where virtual function calls are implemented as indirect function calls through tables of function addresses generated by compilers. Such tables are called virtual tables.

The present invention 328 comprises improved translators 504, improved compilers 406, and improved debuggers 420.

As noted above, this patent document often refers to the C++ computer programming language to illustrate the features, structure, and operation of the present invention 328.

However, these references to the C++ computer programming language are included in this patent document for illustrative purposes only. The present invention 328 is not limited to the C++ computer programming language. Rather, the present invention 328 is adapted and intended to operate with computer programming languages which support polymorphism and which use virtual tables to store virtual member function addresses. The C++ computer programming language is an example of such a computer programming language.

Figure 3:
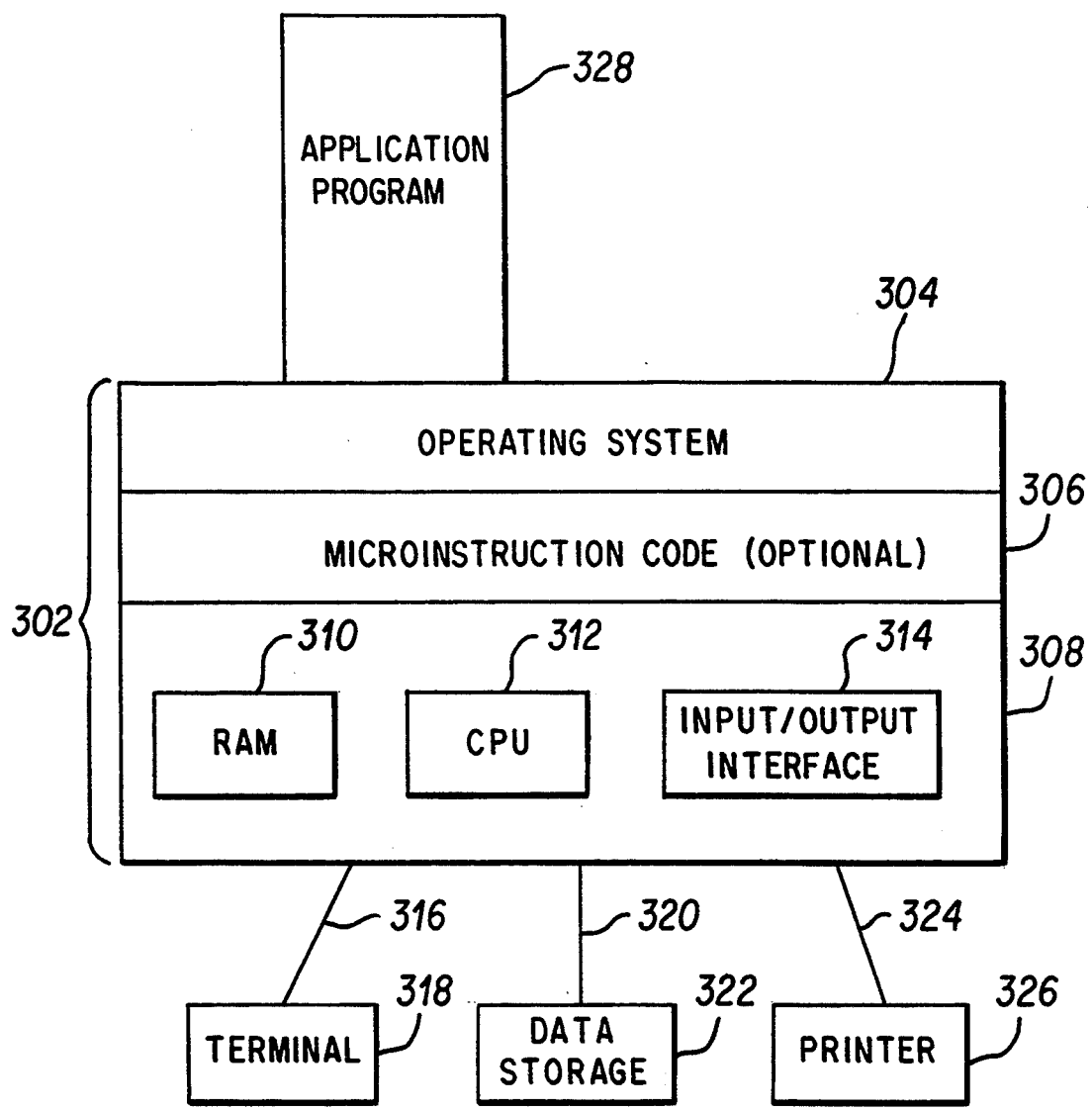
FIG. 3 shows a structural diagram of the computer hardware and software environment in which the present invention operates.

As shown in FIG. 3, the present invention is an application computer program 328 which operates on a computer platform 302. The computer platform 302 includes certain hardware units 308 including a central processing unit (CPU) 312, a random access memory (RAM) 310, and an input/output interface 314. The application computer program 328 may reside on the RAM 310. The computer platform 302 also includes an operating system 304, and may include microinstruction code 306. Various peripheral components may be connected to the computer platform 302, such as a terminal 318, a data storage device 322, and a printing device 326.

In a preferred embodiment of the present invention 328, the computer platform 302 is a HP9000 Series 300, 600, or 800 computer platform and the operating system 304 which runs thereon is HP-UX version 7.0. Also, the application computer program 328 of the present invention 328 is preferably written in the C++ computer programming language.

Figure 4:
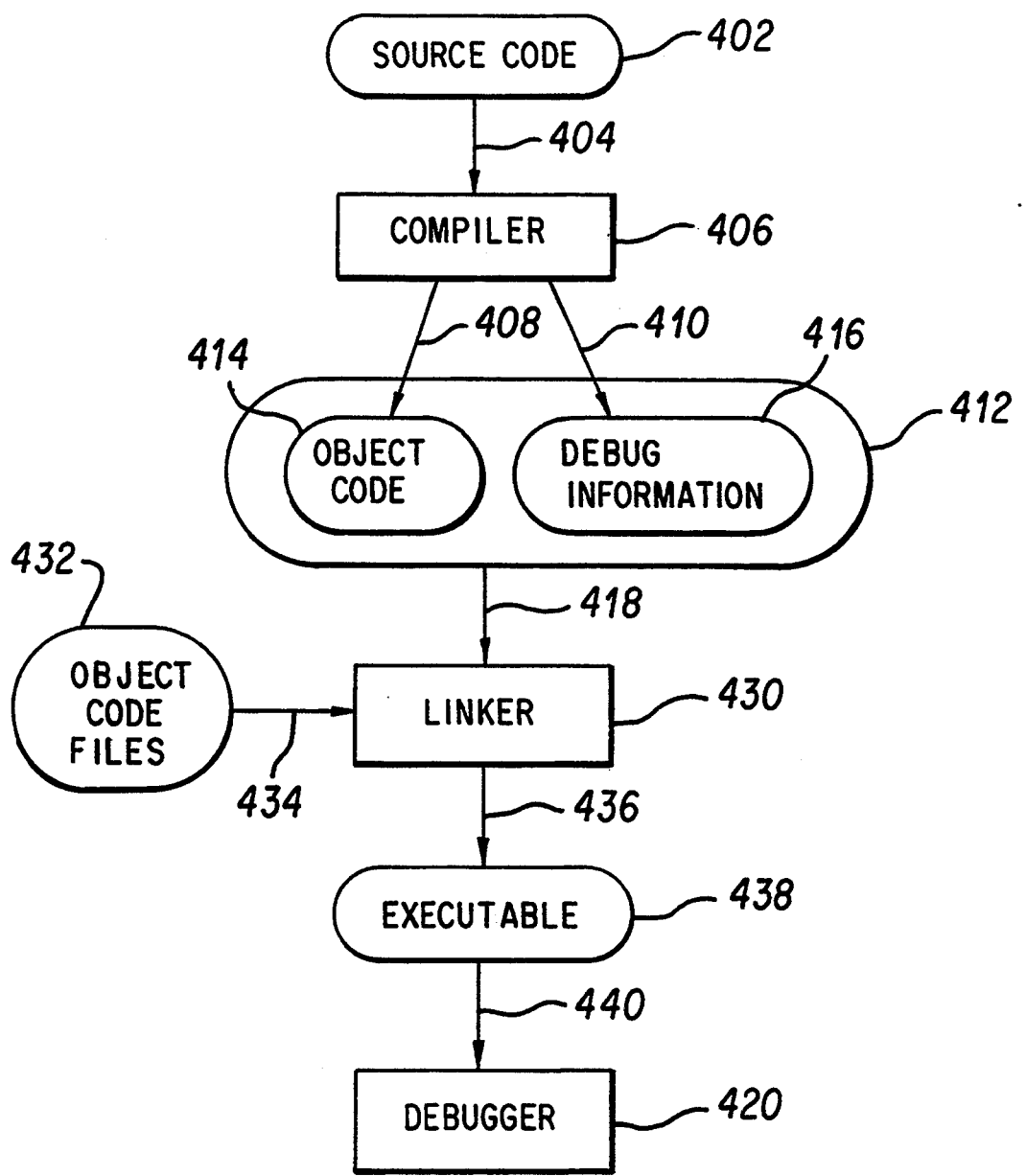
FIG. 4 shows a structural diagram/functional flowchart of a first embodiment of the present invention.

As shown in FIG. 4, a first embodiment of the present invention 328 comprises the compiler 406, a linker 430, and the debugger 420.

Figure 5:
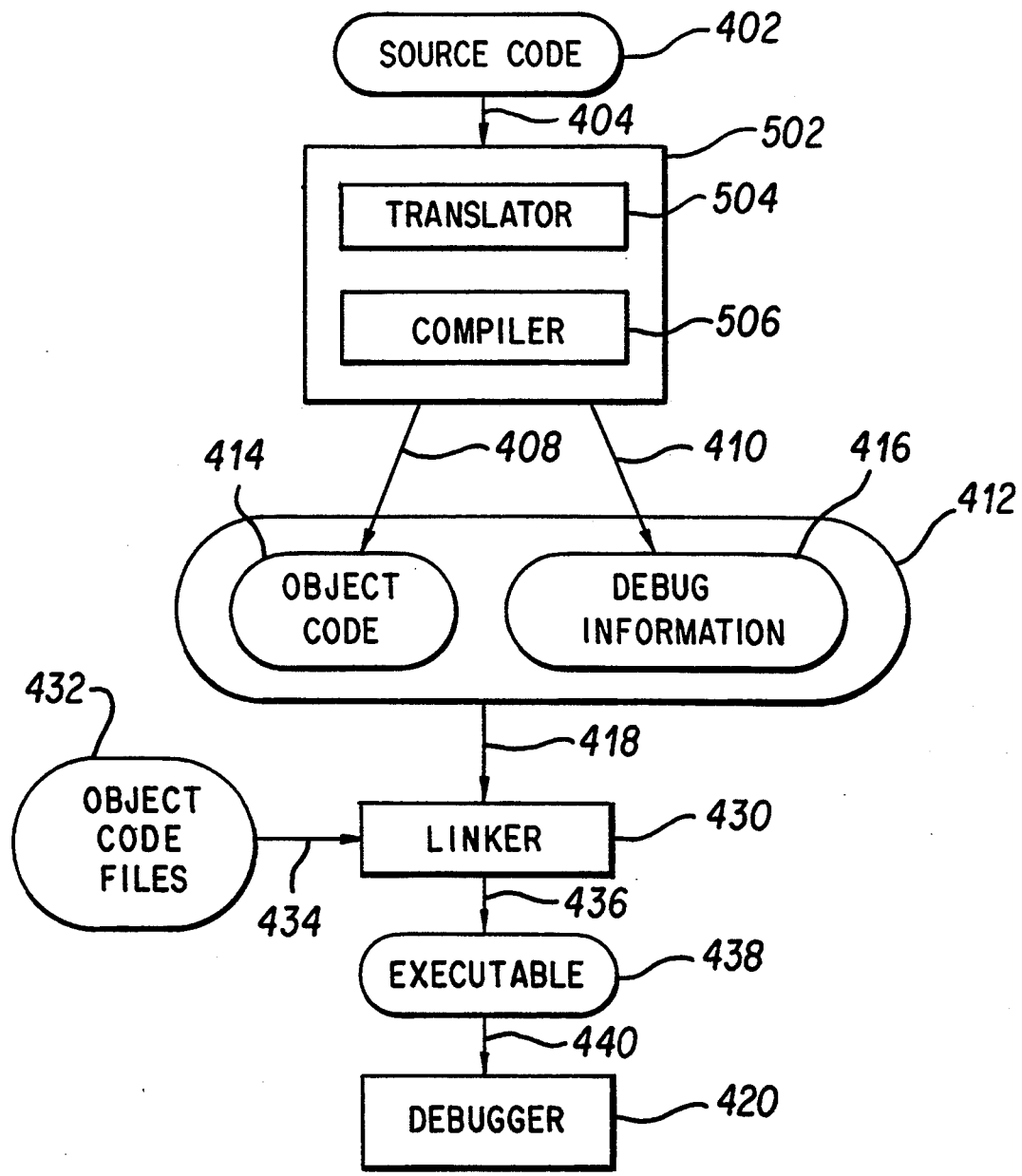
FIG. 5 shows a structural diagram/functional flowchart of a second embodiment of the present invention.

As shown in FIG. 5, a second embodiment of the present invention 328 comprises a translator/compiler combination 502, which includes the translator 504 and a compiler 506. The translator/compiler combination 502 performs the functions of the compiler 406 of the first embodiment. The structure and operation of the translator 504 and compiler 506 of the second embodiment is similar to that of the compiler 406 of the first embodiment. Therefore, the structure and operation of the translator 504 and compiler 506 of the second embodiment, with regard to the features and functions of the present invention 328 as taught and suggested in this patent document, should be obvious to persons with ordinary skill in the art based on the following detailed discussion of the structure and operation of the compiler 406 of the first embodiment.

Some aspects of the present invention 328 can be implemented using existing compiler, translator, linker, and debugger technology. However, modifications upon existing compiler, translator, and debugger technology are necessary to achieve the improvements of the present invention 328. The following discussions focus on these modifications upon existing compiler, translator, and debugger technology. For a general discussion of existing compiler, translator, linker, and debugger technology, see *Compilers, Principles, Techniques, and Tools* by Alfred V. Aho, Ravi Sethi, and Jeffrey D. Ullman (Addison Wesley 1986), which is herein incorporated in its entirety by reference.

The present invention 328 comprises a first approach and a second approach for supporting run-time data type identification of the objects in the computer programs 402.

According to the first approach, the improved compiler 406 stores modified debug information 416 in an object code file 412. The modified debug information 416 contains information regarding multiple virtual tables 1208, 1216, 1220, 1224. A debug lookup table 1236 is constructed from the modified debug information 416. The improved debugger 420 uses the debug lookup table 1236 to determine the actual data types of the objects, and to completely and accurately display and modify the objects' contents.

Also according to the first approach, a lookup table that is similar to the debug lookup table 1236 can be generated. Innovative type inquiry operators can reference the lookup table to determine the actual data types of the objects during run-time.

According to the second approach, which is an improvement upon the first approach, the improved compiler 406 creates concatenated virtual tables 1318. The improved compiler 406 stores the modified debug information 416 in the object code file 412. The modified debug information 416 contains information regarding the concatenated virtual tables 1318. The debug lookup table 1236 is constructed from the modified debug information 416. The improved debugger 420 uses the debug lookup table 1236 to determine the actual data types of the objects, and to completely and accurately display and modify the objects' contents. The innovative type inquiry operators reference the concatenated virtual tables 1318 to determine the actual data types of the objects during run-time.

The operation of the compiler 406 and debugger 420 according to the first and second approaches of the present invention 328 (as briefly described above) is transparent to computer programmers and operators. Therefore, the compiler 406 and debugger 420 support run-time data type identification of the objects in the computer programs 402 in a user-friendly and error-free manner.

As shown in FIG. 4, and as noted briefly above, the first embodiment of the present invention 328 comprises the compiler 406, the linker 430, and the debugger 420. The compiler 406 receives the source code 402 and generates object code 414 and the debug information 416. The object code 414 and the debug information 416 are stored in the object code file 412.

The linker 430 links the object code file 412 with other object code files 432 and forms an executable file 438. The executable file 438 includes at least the object code 414 and the debug information 416.

The debugger 420 receives the executable file 438 and, under the direction of a user (not shown in FIG. 4), uses the object code 414 and the debug information 416 in the executable file 438 to identify and correct errors in the source code 402.

Figure 6:
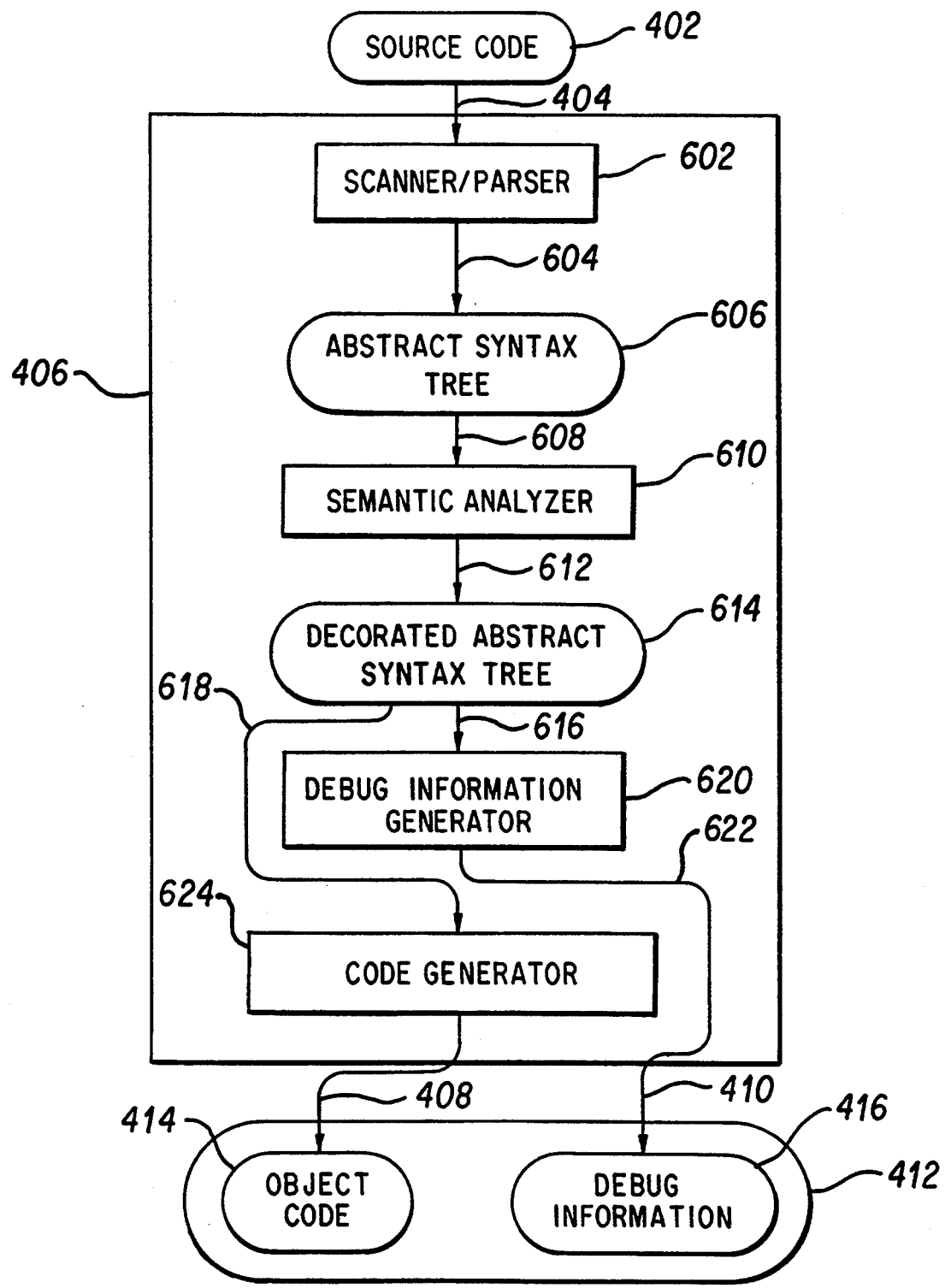
FIG. 6 shows a structural diagram/functional flowchart of a compiler.

A structural diagram/functional flowchart of the compiler 406 is shown in FIG. 6. In FIG. 6, rectangles represent software modules/processes and ovals represent the inputs and outputs of the software modules/processes.

As shown in FIG. 6, the compiler 406 includes a scanner/parser 602, a semantic analyzer 610, a debug information generator 620, and a code generator 624.

The scanner/parser 602 receives the source code 402 and builds an abstract syntax tree 606. The AST 606 essentially models the structure of the source code 402 being compiled. The AST 606 is composed of subtrees which represent declarations, function definitions, statements, and expressions.

The semantic analyzer 610 receives the AST 606 as input. The semantic analyzer 610 "decorates" the nodes of the AST 606 with pointers to symbol table and type table entries (not shown in FIG. 6) to produce a decorated abstract syntax tree 614.

The code generator 624 receives the decorated abstract syntax tree 614 as input. The code generator 1130 generates the object code 414 from the decorated abstract syntax tree 614 and places the object code 414 in the object code file 412.

The debug information generator 620 also receives the decorated abstract syntax tree 614 as input. The debug information generator 620 generates and stores modified debug information 416 in the object code file 412. According to the first approach of the present invention, the modified debug information 416 contains information regarding the multiple virtual tables 1208, 1216, 1220, 1224. According to the second approach of the present invention, the modified debug information 416 contains information regarding the concatentated virtual tables 1318. The debug information generator 620 is described in detail below.

Figure 7:
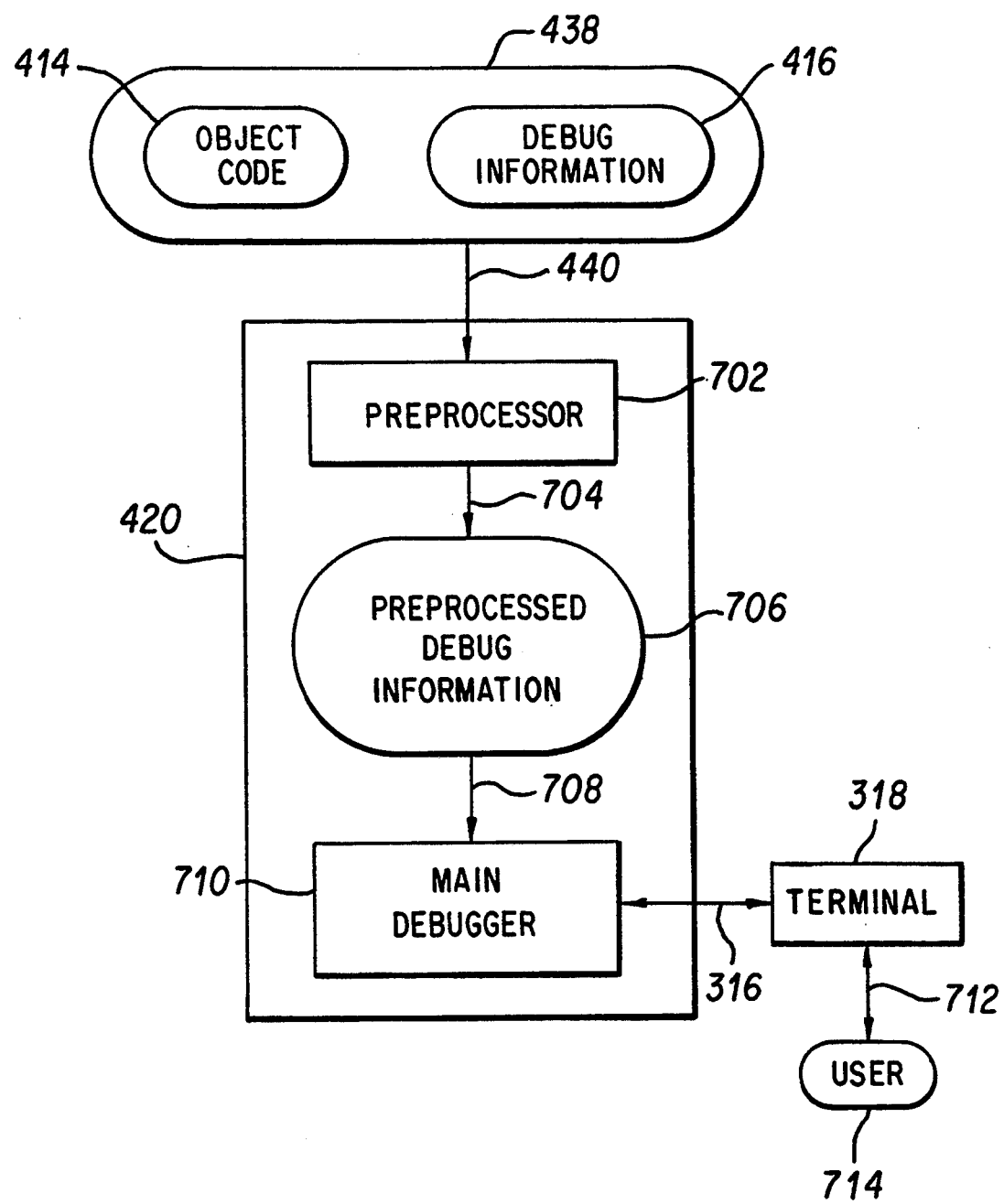
FIG. 7 shows a structural diagram/functional flowchart of a debugger.

A structural diagram/functional flowchart of the debugger 420 is shown in FIG. 7. In FIG. 7, other than the terminal 318 and a user 714, rectangles represent software modules/processes and ovals represent the inputs and outputs of the software modules/processes.

As shown in FIG. 7, the debugger 420 includes a preprocessor 702 and a main debugger 710.

The preprocessor 702 receives the executable file 438 (comprising the object code 414 and debug information 416) and generates a preprocessed debug information 706. The preprocessed debug information 706 is the same as the contents of the executable file 438, except the preprocessor 702 removes duplicate information, fixes up pointers between various parts of the debug information 416, and collects certain data into several special tables which are added to the preprocessed debug information 706 for use by the main debugger 710. Specifically, the preprocessor 702 generates the debug lookup table 1236. The debug lookup table 1236 allows the main debugger 710 to accurately and completely determine at run-time the data type of objects referenced by pointers and reference variables.

The main debugger 710 receives the preprocessed debug information 706. Under the direction of a user 714, who communicates with the main debugger 710 via the terminal 318, the main debugger 710 uses the preprocessed debug information 706 to aid the user 714 in locating and correcting errors in the source code 402.

Specifically, the main debugger 710 uses the preprocessed debug information 706 to, among other things, display the source code 402, display an assembly code translation of the source code 402 generated by the compiler 406, to control and alter the flow of execution through the source code 402, to display variable types, and to view and set variable values.

To support data type identification of objects during run-time, the debugger 420 constructs the debug lookup table 1236. The debugger 420 uses the debug lookup table 1236 to determine the actual data types of the objects, to completely and accurately display the objects' contents, and to allow the user 714 to modify the objects' contents. The debugger 420 is discussed in detail below.

2.0. First Approach—Using Multiple Virtual Tables

This section describes the operation of the debug information generator 620 and the debugger 420 according to the first approach of the present invention 328. First, this section describes the format of the debug lookup table 1236.

Figure 12:
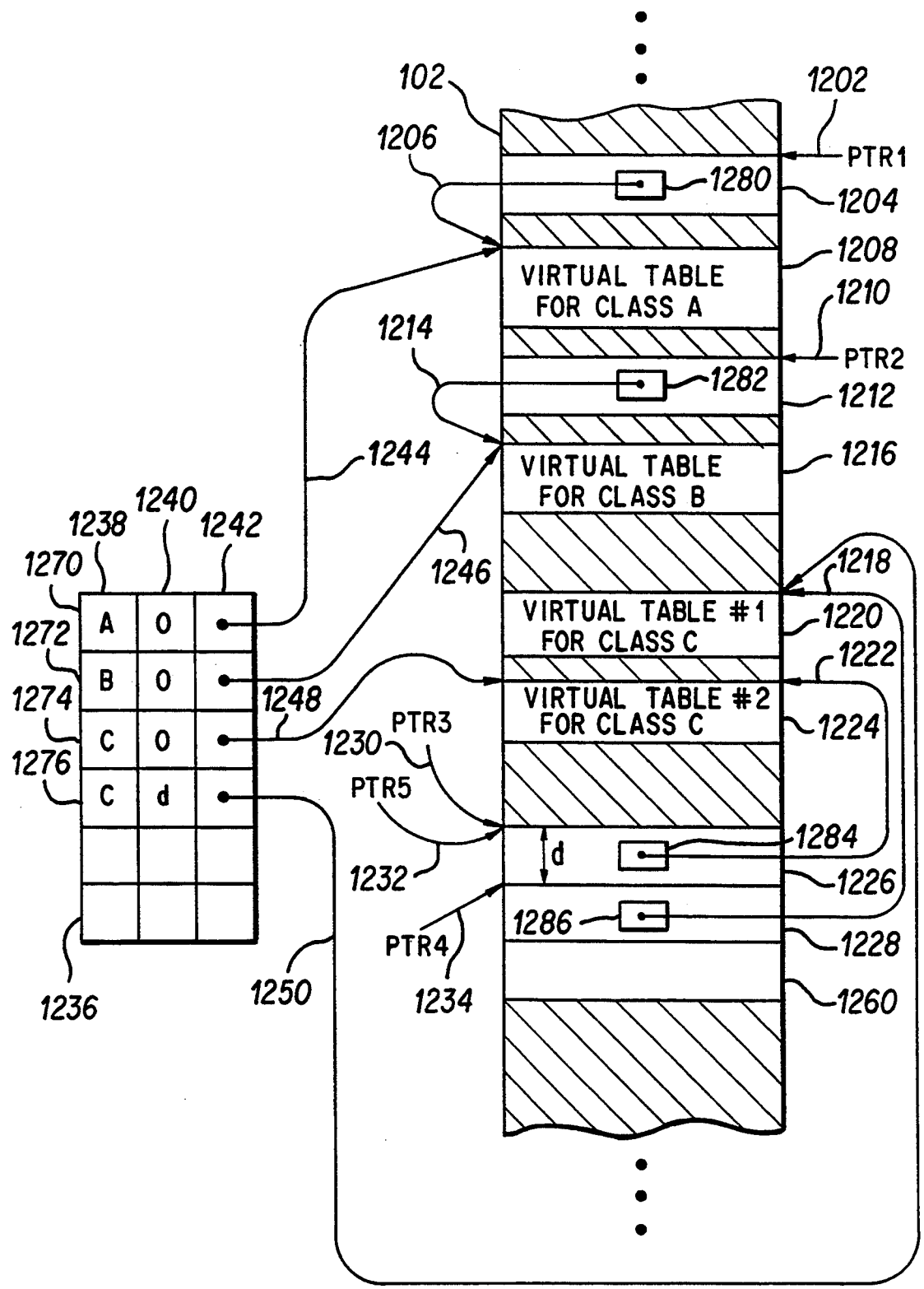
FIG. 12 shows multiple virtual tables and a corresponding debug lookup table.

Suppose the statements in Table 3 are contained in the source code 402. Then FIG. 12 illustrates a corresponding debug lookup table 1236 according to the first approach of the present invention.

TABLE 3

```
class A {
public:
    // members
};
class B {
public:
    // members
};
class C: public A, public B {
    // members
};
A *ptr1 = new A;
```

TABLE 3-continued

```
B *ptr2 = new B;
B *ptr4 = new C;
```

A ptr1 1202 is declared as a pointer of class A and assigned to point to an object 1204 of class A. The object 1204 contains a virtual table address 1206 which points to a virtual table 1208.

A ptr2 1210 is declared as a pointer of class B and assigned to point to an object 1212 of class B. The object 1212 contains a virtual table address 1214 which points to a virtual table 1216.

A ptr4 1234 is declared as a pointer of class B and assigned to point to an object 1226/1228/1260 of class C. The object 1226/1228/1260 contains virtual table addresses 1218, 1222 which point to virtual tables 1220, 1224, respectively.

The debug lookup table 1236 contains an entry 1270, 1272, 1274, 1276 for every virtual table. The entries 1270, 1272, 1274, 1276 contain three fields: a class type identification field 1238, an object offset field 1240, and a virtual table address field 1242.

The virtual table address field 1242 contains the virtual table addresses 1244, 1246, 1248, 1250 of the virtual tables 1208, 1216, 1224, 1220 associated with the entries 1270, 1272, 1274, 1276.

The class type identification field 1238 contains data type information of the objects associated with the virtual table addresses in the virtual table address fields 1242. For example, the debug lookup table 1236 entry 1270 stores a virtual table address 1244. The virtual table address 1244 points to a virtual table 1208. The virtual table 1208 is associated with the class A. Therefore, the class type identification field 1238 associated with the entry 1270 identifies the class A.

The object offset field 1240 contains pointer object offsets to the beginning of objects. As shown in FIG. 12, for example, the ptr4 1234 does not point to the beginning of the object 1226/1228/1260. Specifically, the ptr4 1234 is displaced by an object offset of d (d is equal, in this case, to the size of an object of class A) from the beginning of the object 1226/1228/1260. Therefore, the object offset field 1240 of entry 1276 (the entry 1276 stores a virtual table address 1250 which is equal to a virtual table address 1218 associated with the ptr4 1234) contains a value equal to the offset d.

The operation of the debug information generator 620 and the main debugger 710 according to the first approach of the present invention 328 is described below with reference to FIGS. 8–12.

Figure 8:
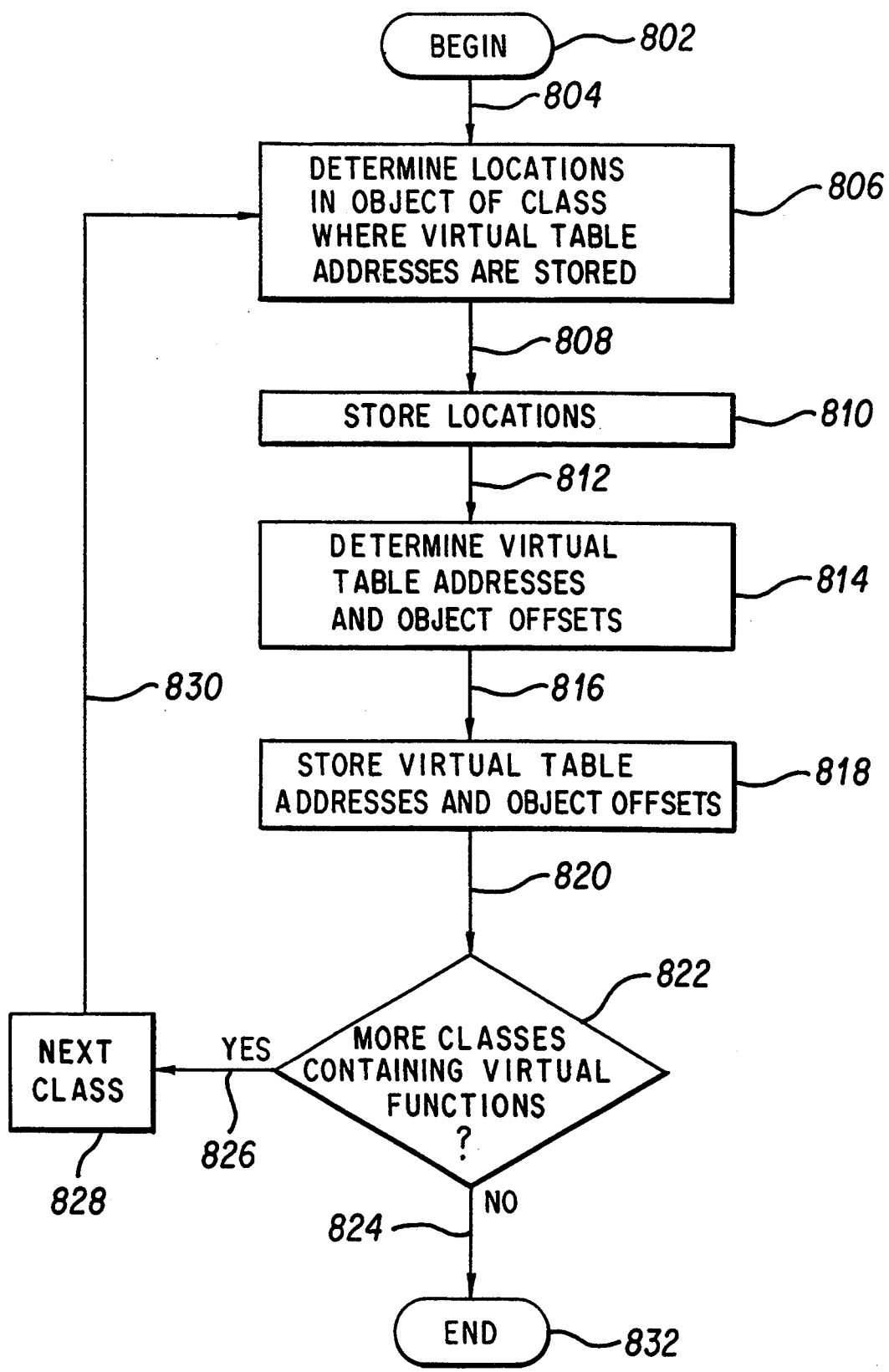
FIG. 8 shows a functional flowchart for generating modified debug information.

FIG. 8 illustrates the manner in which the debug information generator 620 generates the modified debug information 416 according to the first approach of the present invention 328.

In Step 806, the debug information generator 620 locates the classes to which the objects 1204, 1212, 1226/1228/1260 belong in the decorated AST 614. The debug information generator 620 then determines locations 1280, 1282, 1286, 1284 in the objects 1204, 1212, 1226/1228/1260 where the virtual table addresses 1206, 1214, 1218, 1222 are stored.

In Step 810, the debug information generator 620 stores the locations 1280, 1282, 1286, 1284 in the modified debug information 416 (these locations are offsets inside the objects where pointers to the virtual tables are stored).

In Step 814, the debug information generator 620 reads the virtual table addresses 1206, 1214, 1218, 1222 from the objects 1204, 1212, 1226/1228/1260. The debug information generator 620 also determines the object offsets. As noted above (with reference to FIG. 12), the object offsets represent pointer offsets to the beginning of objects.

In Step 818, the debug information generator 620 stores the virtual table addresses 1206, 1214, 1218, 1222 and the object offsets in the modified debug information 416.

As indicated by Steps 822 and 828, Steps 806, 810, 814, and 818 are repeated for all objects which are instantiations of classes containing virtual functions.

Figure 9:
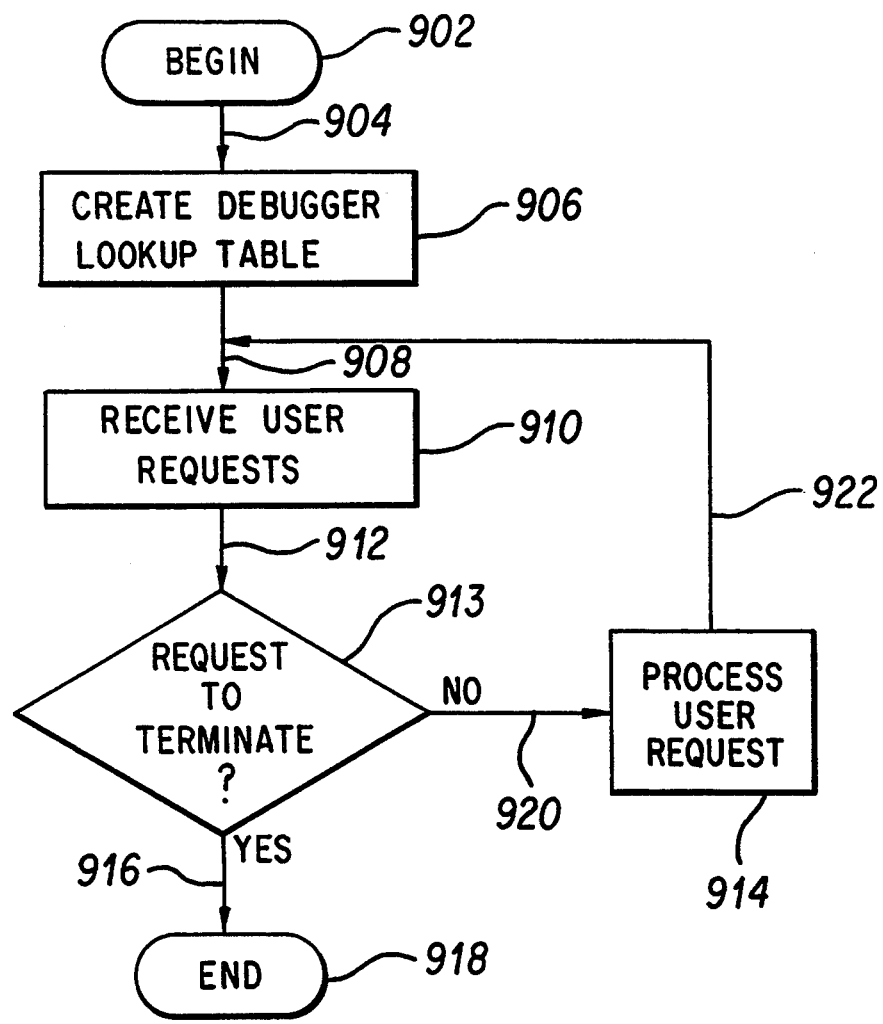
FIG. 9 shows a high-level functional flowchart of the debugger.

FIG. 9 presents a functional flowchart of the high-level operation of the debugger 420 according to the first approach of the present invention.

In Step 906, the debugger 420 uses the modified debug information 416 to create the debug lookup table 1236.

In Step 910, the debugger 420 receives user requests. The user may request the debugger 420 to display the source code 402, display the assembly code translation of the source code 402 generated by the compiler 406, to control and alter the flow of execution through the source code 402, to display variable types, and to view and set variable values.

In Step 914, the debugger 420 processes the user requests. In performing Step 914, the debugger 420 refers to the debug lookup table 1236 when it must determine the data types of objects, accurately and completely display the contents of objects, or allow the user 714 to modify the contents of the objects.

Figure 10:
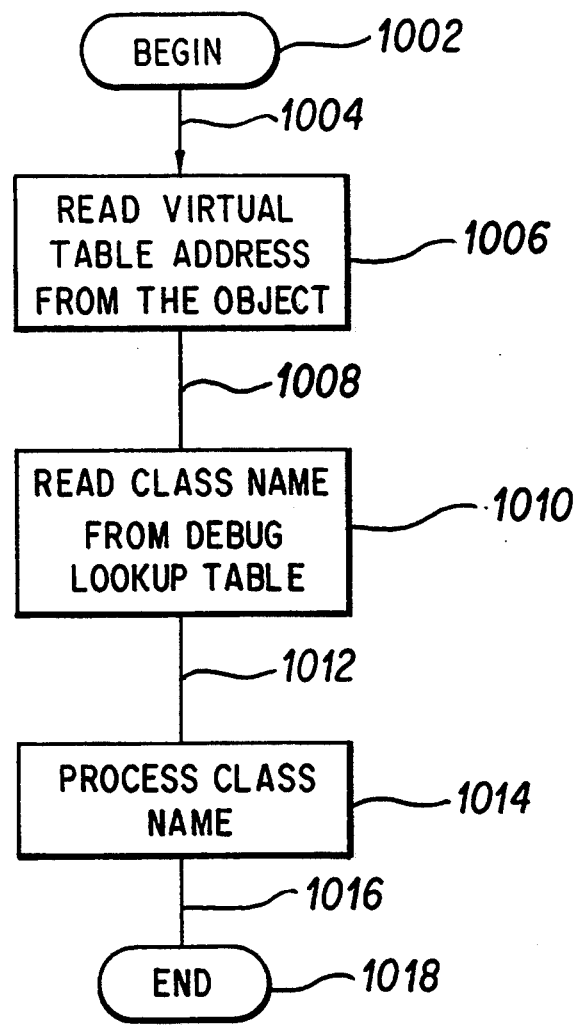
FIG. 10 shows a functional flowchart for accurately determining data types of objects during run-time.

The manner in which the debugger 420 accurately determines the data types of objects is presented in FIG. 10. The flowchart in FIG. 10 is described below with reference to the ptr4 1234 in FIG. 12. Specifically, suppose the user requests that the debugger 420 display the data type of the object 1226/1228/1260 pointed to by the ptr4 1234.

In Step 1006, the debugger 420 reads the virtual table address 1286 in the object 1226/1228/1260 referenced by the ptr4 1234.

In Step 1010, the debugger 420 searches the debug lookup table 1236 for an entry whose virtual table address (in the virtual table address field 1242) is equal to that read in Step 1006. For the present example, the debugger 420 locates the entry 1276. Then, the debugger 420 reads the class type identification field 1238 of the entry 1276 to determine the data type of the object 1226/1228/1260 pointed to by the ptr4 1234. For the present example, the debugger 420 correctly determines that the data type is class C.

In Step 1014, the debugger 420 uses the data type information to finish the processing of the user request. For the present example, the debugger 420 may simply display the data type information.

The flowchart in FIG. 10, for determining the data types of objects referenced by pointers or reference variables, is also applicable for the innovative type inquiry operators. For example, the compiler 406 could emit a lookup table 1236 to the object code 414. Then, the innovative type inquiry operators could refer to the lookup table 1236 (according to the flowchart in FIG. 10) to determine the data type of objects during run-time.

Figure 11:
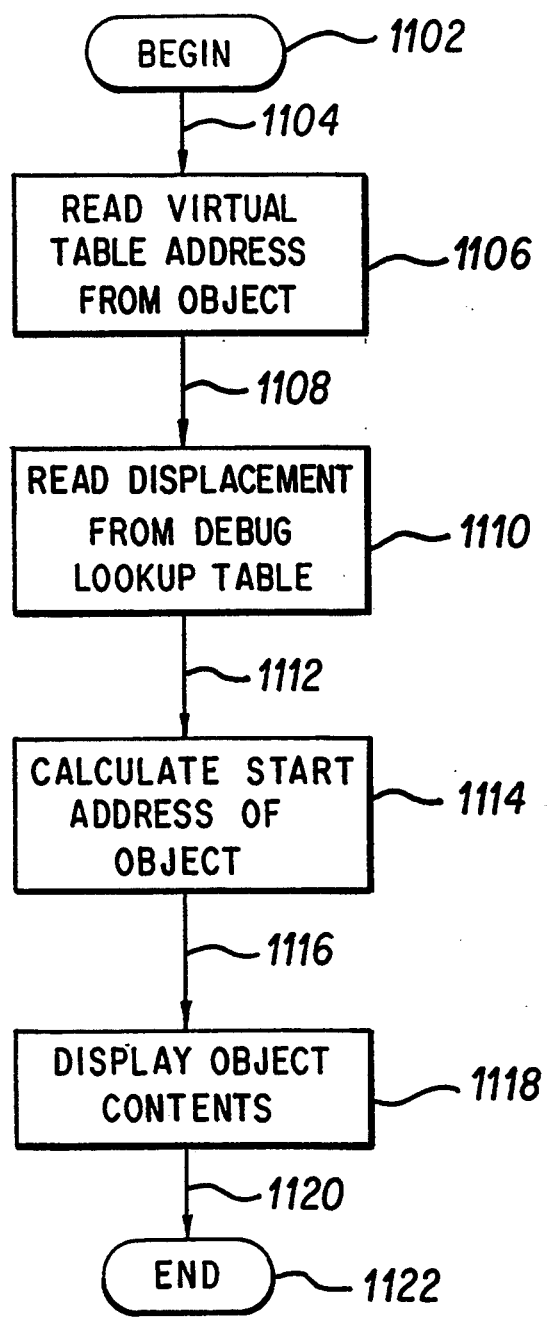
FIG. 11 shows a functional flowchart for accurately and completely determining the contents of objects during run-time.

The manner in which the debugger 420 accurately and completely determines the contents of objects is presented in FIG. 11. The flowchart in FIG. 11 is described below with reference to the ptr4 1234 in FIG. 12. Specifically, suppose the user requests that the debugger 420 display the contents of the object 1226/1228/1260 pointed to by the ptr4 1234.

In Step 1106, the debugger 420 reads the virtual table address 1286 in the object 1226/1228/1260 that is referenced by the ptr4 1234.

In Step 1110, the debugger 420 searches the debug lookup table 1236 for an entry whose virtual table address (in the virtual table address field 1242) is equal to that read in Step 1106. For the present example, the debugger 420 locates the entry 1276. Then, the debugger 420 reads the object offset field 1240 of the entry 1276. For the present example, the debugger 420 reads the object offset d. As shown in FIG. 12, the offset d represents the object offset of the ptr4 1234 from the beginning of the object 1226/1228/1260.

In Step 1114, the debugger 420 calculates a start address of the object 1226/1228/1260. In the preferred embodiment, the debugger 420 calculates the start address by subtracting the object offset d from the ptr4 1234.

In Step 1118, the debugger 420 uses the start address to display the contents of the object 1226/1228/1260 to the user.

If, instead, the user 714 had requested that the contents of the object 1226/1228/1260 be modified, all steps in FIG. 11 would be identical to the user request for displaying the object contents except for Step 1118, which would be replaced by a Step 1118' (not explicitly shown in FIG. 11). In Step 1118', the debugger 420 uses the start address to modify the contents of the object 1226/1228/1260.

3.0. Second Approach—Using Concatenated Virtual Tables

This section describes the operation of the debug information generator 620 and the main debugger 710 according to the second approach of the present invention 328. As noted above, the second approach is an improvement of the first approach.

As noted above, the first approach enables the debugger 420 to accurately determine the data type of objects, to accurately and completely display the contents of the objects, and to allow the user 714 to modify the contents of the objects. Also, the first approach enables the innovative type inquiry operators to accurately determine the data type of objects during run-time.

As a general rule, however, table lookups during run-time should be avoided for efficiency reasons. Therefore, while achieving the objectives of the present invention 328, the first approach is relatively inefficient with regard to enabling the innovative type inquiry operators to determine the data type of objects during run-time.

The second approach of the present invention 328 solves the efficiency problem of the first approach by using the concatenated virtual tables 1318, rather than the multiple virtual tables 1208, 1216, 1220, 1224. Specifically, a unique, distinct concatenated virtual table 1318 is generated for each class. For some classes, the concatenated virtual table 1318 may be made up from only one virtual table, but for other classes, the concatenated virtual table 1318 may contain multiple virtual tables.

This section describes the second approach of the present invention 328 by first describing the format of the concatenated virtual tables 1318.

Figure 13:
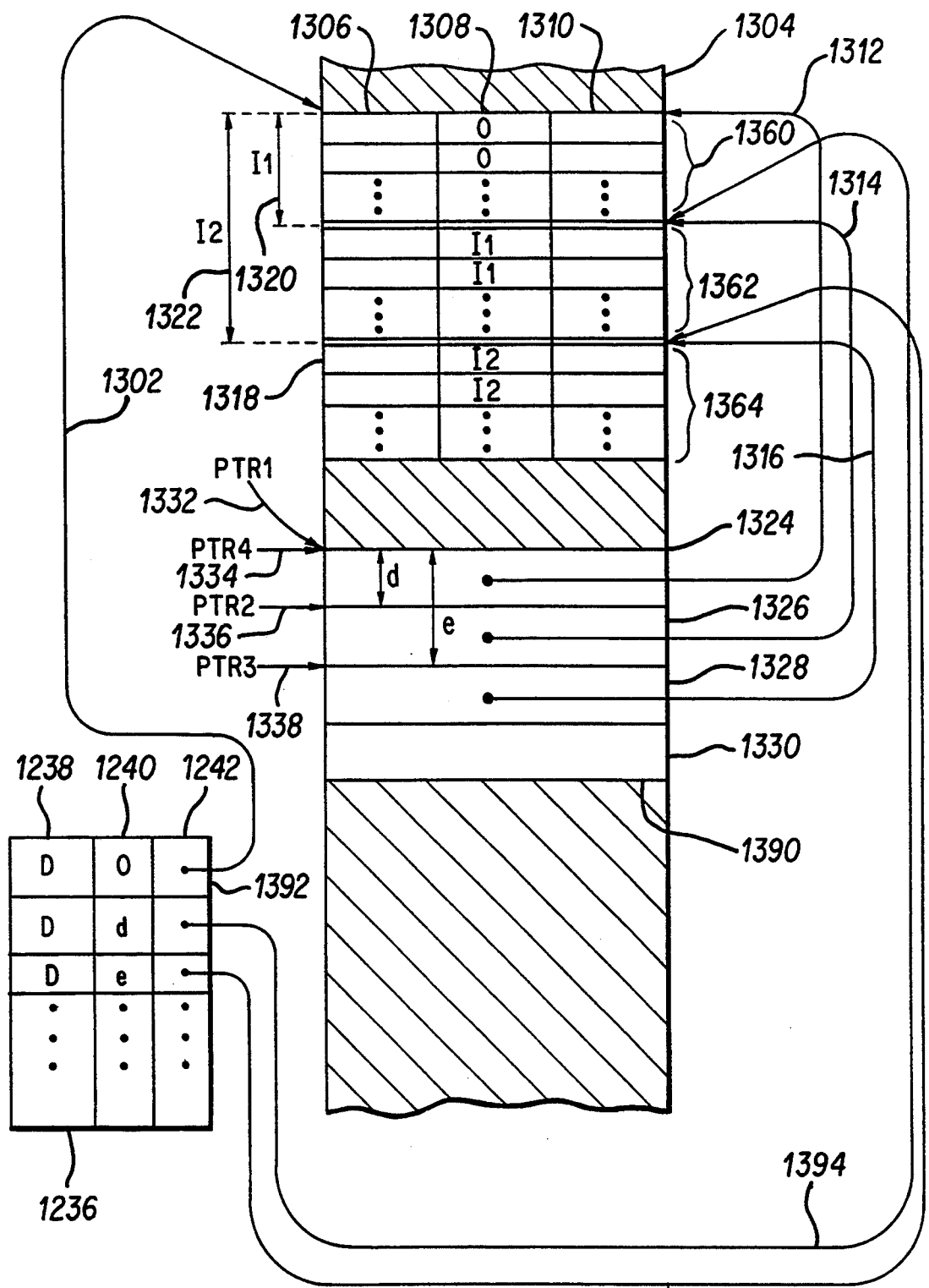
FIG. 13 shows a concatenated virtual table and a corresponding debug lookup table.

Suppose the statements in Table 4 are contained in the source code 402. FIG. 13 illustrates a corresponding concatenated virtual table 1318 and a debug lookup table 1236 according to the second approach of the present invention 328.

TABLE 4

```
class A {
public:
    // members
};
class B {
public:
    // members
};
class C {
public:
    // members
};
class D: public A, public B, public C {
    // members
};
B *ptr2 = new D;
```

A ptr2 1336 is declared as a pointer of class B and assigned to point to an object 1390 of class D. The object 1390 contains virtual table addresses 1312, 1314, 1316 that point to virtual tables 1360, 1362, 1364, respectively.

Generally, compilers 406 emit multiple virtual tables for an object. This is shown in FIG. 12, where the compiler 406 emitted the multiple virtual tables 1220, 1224 for the object 1226/1228/1260. In this patent document, the term "multiple" means that the virtual tables are not contiguous in memory.

Generally, the multiple virtual tables 1220, 1224 essentially comprise two fields, a field 112, 116 containing a pointer to a member function code segment and a field 110, 114 containing information related to calling the member function code segment. This is shown in FIG. 1.

According to the second approach of the present invention 328, the compiler 406 emits a concatenated virtual table 1318 for an object 1390 of class D. This is shown in FIG. 13, where the compiler 406 emitted the concatenated virtual table 1318 for the object 1390. The concatenated virtual table 1318 contains virtual tables 1360, 1362, 1364. In this patent document, the term "concatenated" means that the virtual tables are contiguous in memory.

Also according to the second approach of the present invention 328, the virtual tables 1360, 1362, 1364 emitted by the compiler 406 contain three fields 1306, 1308, 1310. The field 1306 corresponds to the field 112, 116 containing the pointer to the member function code segment. The field 1310 corresponds to the field 110, 114 containing information related to calling the member function code segment.

The additional field 1308 contains pointer table offset values. A pointer table offset value associated with a particular virtual table represents a displacement from the beginning of the virtual table to the beginning of a concatenated virtual table for which the virtual table is a part. For example, the pointer table offset value for the virtual table 1364 is I2, because the beginning of the virtual table 1364, pointed to by virtual table address 1316, is displaced I2 from the beginning of the concatenated virtual table 1318, pointed to by the virtual table address 1302. Note that the pointer table offset values in the table offset fields 1308 are distinct from the pointer object offset values in the object offset fields 1240 in the debug lookup table 1236.

The operation of the compiler 406 and the main debugger 710 according to the second approach of the present invention 328 is described below.

As noted above, the compiler 406 emits concatenated virtual tables 1318, rather than multiple virtual tables 1220, 1224, for objects according to the second approach of the present invention 328. The virtual tables 1360, 1362, 1364 contained in the concatenated virtual tables 1318, and emitted by the compiler 406, contain the table offset field 1308 in addition to the fields 1306 and 1310.

Also, the debug information generator 620 generates the modified debug information 416. The manner in which the debug information generator 620 generates the modified debug information 416 is the same for both the first and second approaches of the present invention 328. Therefore, the operation of the debug information generator 620 according to the second approach of the present invention 328 is adequately described above with reference to FIG. 8.

Figure 14:
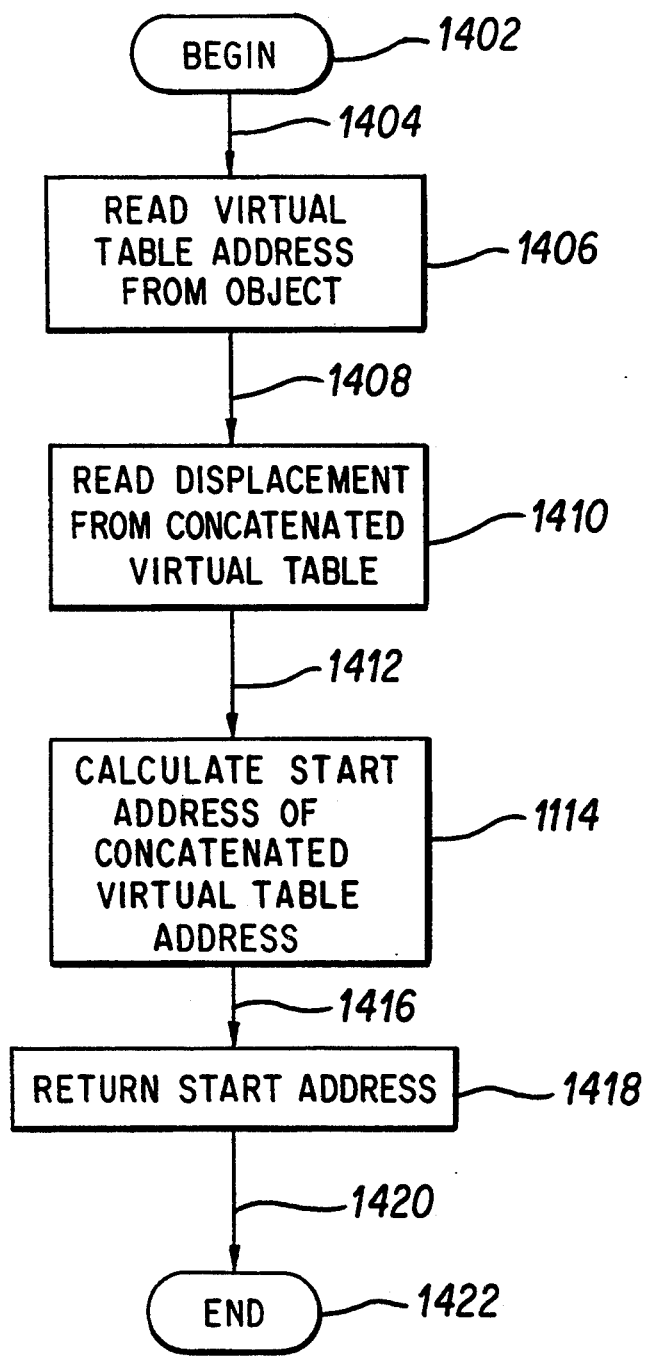
FIG. 14 shows a functional flowchart for determining start addresses of concatenated virtual tables.

The manner in which the innovative type inquiry operators accurately determine the data type of objects during run-time is described below with reference to FIGS. 13 and 14. The flowchart in FIG. 14 is described below with reference to the ptr2 1336 in FIG. 13. Specifically, suppose a C++ operator, as part of its function, must determine the data type of the object 1390 pointed to by the ptr2 1336.

An innovative "typeof()" operator is an example of such a C++ type inquiry operator. The typeof() operator receives a pointer (or a reference variable) to an object and returns a data type indication of the object's data type. The typeof() operator returns the same data type indication for all pointers associated with the object. In FIG. 13, for example, the typeof() operator returns the virtual table address 1302 for the ptr1 1332, ptr2 1336, ptr3 1338, and ptr4 1334. In this particular example, the data type indication is the virtual table address 1302 of the start of the concatenated virtual table 1318.

Referring now to FIG. 14, in Step 1406, the C++ operator or function, such as typeof(), reads the virtual table address 1314 in the object 1390 referenced by the ptr2 1336.

In Step 1410, the C++ operator or function, such as typeof(), uses the virtual table address 1314 to access the virtual table 1362 and read the table offset field 1308. In the present example, the table offset value I1 is read.

In Step 1414, the C++ operator or function, such as typeof(), calculates the start address of the concatenated virtual table 1318. The start address of the concatenated virtual table 1318 is equal to the virtual table address 1302. In the preferred embodiment of the present invention 328, the start address is calculated by subtracting the table offset value I1 from the virtual table address 1314.

In Step 1418, the C++ operator or function retains the start address that was calculated in Step 1414 for further processing. For example, the typeof() operator may simply return the start address of the concatenated virtual table 1318.

The operation of the debugger 420 is the same for both the first and second approaches of the present invention 328. Therefore, the operation of the debugger 420 according to the second approach of the present invention 328 is adequately described above with reference to FIGS. 9, 10, and 11.

Note that the first and second approaches of the present invention 328 are applicable only to classes which contain virtual member functions. However, it should be obvious to those with ordinary skill in the art that compile-time switches could be implemented to emit pointers to unique tables inside all structures (except for those structures which are explicitly declared with 'extern "C"'). Such compile-time switches would ensure that the present invention 328 would apply to all classes.

Based on the discussion above, it should be obvious to those with ordinary skill in the art that the concatenated virtual tables 1318 are useful for implementing other innovative operators and functions. For example, by an obvious extension of the concatenated virtual tables 1318, a "sizeof( )" operator for objects referenced by pointers and reference variables could be implemented. The sizeof( ) operator would receive pointers (or reference variables) to objects and return the actual size of the object, as opposed to the size of the class specified in the declaration of the pointer or reference variable.

What is claimed is:

1. A computer implemented software compilation and debugging system, for use with a source code, wherein the source code is written in an object-oriented computer programming language which uses virtual tables to support polymorphism by storing virtual member function addresses, and wherein the source code includes objects having object data types, object contents, and addresses to the virtual tables, wherein the virtual table addresses are used to access, during run-time, the virtual member function addresses stored in the virtual tables such that dynamic binding of function code to the objects is achieved, the system comprising:
(1 ) first means for generating an object code and debug information of the source code, said debug information comprising said virtual table addresses and virtual table address locations; and
(2) second means, operating under the direction of a user, for locating and correcting errors in the source code by using said debug information, said second means comprising:
 (a) means for accurately determining said object data types in response to a request to do so from the user; and
 (b) means for accurately and completely determining said object contents in response to a request to do so from the user;
wherein said second means also comprises means for generating a debug lookup table, said debug lookup table comprising entries for said virtual tables, said entries comprising object data type identification fields, object offset fields, and virtual table address fields;
wherein said means for accurately determining said object data types comprises:
 (i) means for reading said virtual table addresses in said objects by using pointers which address said objects;
 (ii) means for accessing said debug lookup table and reading data type identification information in said data type identification fields by matching said virtual table addresses read from said objects to said virtual table addresses stored in said debug lookup table, wherein said data type identification information identifies said object data types; and
 (iii) means for using said data type identification information to process user requests.

2. The system of claim 1, wherein said first means comprises:
(1) a scanner/parser for receiving the source code and generating an abstract syntax tree;
(2) a semantic analyzer for receiving said abstract syntax tree and generating a decorated abstract syntax tree;
(3) a code generator for receiving said decorated abstract syntax tree and generating said object code; and
(4) a debug information generator for receiving said decorated abstract syntax tree and generating said debug information.

3. The system of claim 2, wherein said debug information generator comprises:
(1) means for determining said virtual table address locations;
(2) means for determining said virtual table addresses and object offsets; and
(3) means for storing said virtual table address locations, virtual table addresses, and object offsets in said debug information.

4. The system of claim 1, wherein said means for accurately and completely determining said object contents comprises:
(1) means for reading said virtual table addresses in said objects by using pointers which address said objects;
(2) means for accessing said debug lookup table and reading pointer object offset values in said object offset fields by matching said virtual table addresses read from said objects to said virtual table addresses stored in said debug lookup table;
(3) means for using said pointer object offset values to calculate object starting addresses; and
(4) means for using said object starting addresses to display and modify said object contents.

5. The system of claim 1, wherein said first means comprises:
(1) means for generating a lookup table, wherein said lookup table comprises entries for said virtual tables, and wherein said entries comprise object data type identification fields, object offset fields, and virtual table address fields; and
(2) means for storing said lookup table in said object code;
wherein said lookup table is accessed by type inquiry operators, such that said type inquiry operators can determine said object data types during run-time.

6. The system of claim 1, wherein said first means comprises:
(1) means for generating concatenated virtual tables, wherein said concatenated virtual tables comprise table offset fields; and
(2) means for storing said concatenated virtual tables in said object code.

7. The system of claim 6, further supporting a typeof( ) operator for determining said object data types during run-time, said typeof( ) operator comprising:
(1) means for reading said virtual table addresses by using pointers and reference variables, wherein said pointers and reference variables refer to said objects;

(2) means for accessing said concatenated virtual tables and reading pointer table offset values in said table offset fields according to said virtual table addresses;

(3) means for using said pointer table offset values to calculate concatenated virtual table starting addresses, wherein said concatenated virtual table starting addresses identify said object data types; and (4) means for determining said object data types by using said concatenated virtual table starting addresses to reference said debug information.

8. A computer implemented software compiler, for use with a source code, wherein the source code is written in an object-oriented computer programming language which uses virtual tables to support polymorphism by storing virtual member function addresses, and wherein the source code includes objects having object data types, object contents, and addresses to the virtual tables, wherein the virtual table addresses are used to access, during run-time, the virtual member function addresses stored in the virtual tables such that dynamic binding of function code to the objects is achieved, the compiler comprising:

(1) first means for receiving the source code and generating an abstract syntax tree;

(2) second means for receiving said abstract syntax tree and generating a decorated abstract syntax tree;

(3) third means for receiving said decorated abstract syntax tree and generating an object code of the source code;

(4) fourth means for receiving said decorated abstract syntax tree and generating debug information of the source code, wherein said debug information comprises said virtual table addresses and virtual table address locations, said debug information being used by a debugger to locate and correct errors in the source code;

(5) means for generating concatenated virtual tables, wherein said concatenated virtual tables comprise table offset fields; and (6) means for storing said concatenated virtual tables in said object code; wherein said concatenated virtual tables supports operation of a typeof() operator comprising:

(i) means for reading said virtual table addresses by using pointers and reference variables, wherein said pointers and reference variables refer to said objects;

(ii) means for accessing said concatenated virtual tables and reading pointer table offset values in said table offset fields according to said virtual table addresses;

(iii) means for using said pointer table offset values to calculate concatenated virtual table starting addresses, wherein said concatenated virtual table starting addresses identify said object data types; and (iv) means for determining said object data types by using said concatenated virtual table starting addresses to reference said debug information.

9. The system of claim 8, wherein said fourth means comprises:

(1) means for determining said virtual table address locations;

(2) means for determining said virtual table addresses and object offsets; and (3) means for storing said virtual table address locations, virtual table addresses, and object offsets in said debug information.

10. The system of claim 8, wherein said compiler further comprises:

(1) means for generating a lookup table, wherein said lookup table comprises entries for said virtual tables, and wherein said entries comprise object data type identification fields, object offset fields, and virtual table address fields; and (2) means for storing said lookup table in said object code;

wherein said lookup table is accessed by type inquiry operators, such that said type inquiry operators can determine said object data types during run-time.

11. A computer implemented debugger, operating under the direction of a user, for locating and correcting errors in a source code by using debug information, wherein the source code is written in an object-oriented computer programming language which uses virtual tables to support polymorphism by storing virtual member function addresses, and wherein the source code includes objects having object data types, object contents, and addresses to the virtual tables, wherein the virtual table addresses are used to access, during run-time, the virtual member function addresses stored in the virtual tables such that dynamic binding of function code to the objects is achieved, and wherein said debug information comprises said virtual table addresses and virtual table address locations, the debugger comprising:

(1) first means for generating a debug lookup table, said debug lookup table comprising entries for said virtual tables, wherein said entries comprise object data type identification fields, object offset fields, and virtual table address field;

(2) second means for accurately determining said object data types in response to a request to do so from the user; and (3) third means for accurately and completely determining said object contents in response to a request to do so from the user;

wherein said second means comprises:

(i) means for reading said virtual table addresses in said objects by using pointers which address said objects;

(ii) means for accessing said debug lookup table and reading data type identification information in said data type identification fields by matching said virtual table addresses read from said objects to said virtual table addresses stored in said debug lookup table, wherein said data type identification information identifies said object data types; and (iii) means for using said data type identification information to process user requests.

12. The system of claim 11, wherein said third means comprises:

(1) means for reading said virtual table addresses in said objects by using pointers which address said objects;

(2) means for accessing said debug lookup table and reading pointer object offset values in said object offset fields by matching said virtual table addresses read from said objects to said virtual table addresses stored in said debug lookup table;

(3) means for using said pointer object offset values to calculate object starting addresses; and (4) means for using said object starting addresses to display and modify said object contents.

13. A computer implemented software compilation and debugging method, for use with a source code, wherein the source code is written in an object-oriented computer programming language which uses virtual tables to support polymorphism by storing virtual member function addresses, and wherein the source code includes objects having object data types, object contents, and addresses to the virtual tables, wherein the virtual table addresses are used to access, during run-time, the virtual member function addresses stored in the virtual tables such that dynamic binding of function code to the objects is achieved, the method comprising the steps of:
  (a) generating an object code of the source code;
  (b) generating debug information of the source code, said debug information comprising said virtual table addresses and virtual table address locations; and
  (c) locating and correcting errors in the source code under the direction of a user by using said debug information, said step for locating and correcting errors comprising the steps of:
    (1) generating a debug lookup table comprising entries for said virtual tables, said entries comprising object data type identification fields, object offset fields, and virtual table address fields;
    (2) accurately determining said object data types in response to a request to do so from the user; and
    (3) accurately and completely determining said object contents in response to a request to do so from the user;
  wherein step (2) comprises the steps of:
    (i) reading said virtual table addresses in said objects by using pointers which address said objects;
    (ii) accessing said debug lookup table and reading data type identification information in said data type identification fields by matching said virtual table addresses read from said objects to said virtual table addresses stored in said debug lookup table, wherein said data type identification information identifies said object data types; and
    (iii) using said data type identification information to process user requests.

14. The method of claim 13, wherein said step for generating debug information of the source code comprises the steps of:
  (a) determining said virtual table address locations associated with said objects of a class;
  (b) storing said virtual table address locations in said debug information;
  (c) determining said virtual table addresses associated with said objects of said class;
  (d) determining object offsets;
  (e) storing said virtual table addresses and object offsets in said debug information; and
  (f) repeating steps (a)–(e) for all of said classes.

15. The method of claim 13, wherein said step for accurately and completely determining said object contents comprises the steps of:
  (a) reading virtual table addresses in said objects by using pointers which address said objects;
  (b) accessing said debug lookup table and reading pointer object offset values in said object offset fields by matching said virtual table addresses read from said objects to said virtual table addresses stored in said debug lookup table;
  (c) using said pointer object offset values to calculate object starting addresses; and
  (d) using said object starting addresses to display and modify said object contents.

16. The method of claim 13, wherein said step for generating an object code of the source code comprises the steps of:
  (a) generating a lookup table, wherein said lookup table comprises entries for said virtual tables, and wherein said entries comprise object data type identification fields, object offset fields, and virtual table address fields; and
  (b) storing said lookup table in said object code;
wherein said lookup table is accessed by type inquiry operators, such that said type inquiry operators can determine said object data types during run-time.

17. The method of claim 13, wherein said step for generating an object code of the source code comprises the steps of:
  (a) generating concatenated virtual tables, wherein said concatenated virtual tables comprise table offset fields; and
  (b) storing said concatenated virtual tables in said object code.

18. The method of claim 17, further supporting a typeof() operator method for determining said object dam types during run-time, said typeof() operator method comprising the steps of:
  (a) reading said virtual table addresses by using pointers and reference variables, wherein said pointers and reference variables refer to said objects;
  (b) accessing said concatenated virtual tables and reading pointer table offset values in said table offset fields according to said virtual table addresses;
  (c) using said pointer table offset values to calculate concatenated virtual table starting addresses, wherein said concatenated virtual table starting addresses identify said object data types; and
  (d) determining said object data types by using said concatenated virtual table starting addresses to reference said debug information.

19. A computer implemented software compiler method, for use with a source code, wherein the source code is written in an object-oriented computer programming language which uses virtual tables to support polymorphism by storing virtual member function addresses, and wherein the source code includes objects having object data types, object contents, and addresses to the virtual tables, wherein the virtual table addresses are used to access, during run-time, the virtual member function addresses stored in the virtual tables such that dynamic binding of function code to the objects is achieved, the compiler method comprising the steps of:
  (a) generating an object code of the source code; and
  (b) generating debug information of the source code, wherein said debug information comprises said virtual table addresses and virtual table address locations, said debug information being used by a debugger to locate and correct errors in the source code;
wherein step (a) comprises the steps of:
  (1) generating concatenated virtual tables, wherein said concatenated virtual tables comprise table offset fields; and (2) storing said concatenated virtual tables in said object code;

said concatenated virtual tables supporting operation of a typeof( ) operator method comprising the steps of:

(i) reading said virtual table addresses by using pointers and reference variables, wherein said pointers and reference variables refer to said objects;

(ii) accessing said concatenated virtual tables and reading pointer table offset values in said table offset fields according to said virtual table addresses;

(iii) using said pointer table offset values to calculate concatenated virtual table starting addresses, wherein said concatenated virtual table starting addresses identify said object data types; and (iv) determining said object data types by using said concatenated virtual table starting addresses to reference said debug information.

20. The method of claim 19, wherein said step for generating debug information of the source code comprises the steps of:

(a) determining said virtual table address locations associated with said objects of a class;

(b) storing said virtual table address locations in said debug information.

(c) determining said virtual table addresses associated with said objects of said class;

(d) determining object offsets;

(e) storing said virtual table addresses and object offsets in said debug information;

(f) repeating steps (a)–(e) for all of said classes.

21. The method of claim 19, wherein said step for generating an object code of the source code comprises the steps of:

(a) generating a lookup table, wherein said lookup table comprises entries for said virtual tables, and wherein said entries comprise object data type identification fields, object offset fields, and virtual table address fields; and (b) storing said lookup table in said object code;

wherein said lookup table is accessed by type inquiry operators, such that said type inquiry operators can determine said object data types during run-time.

22. A computer implemented software debugger method, operating under the direction of a user, for locating and correcting errors in a source code by using debug information, wherein the source code is written in an object-oriented computer programming language which uses virtual tables to support polymorphism by storing virtual member function addresses, and wherein the source code includes objects having object data types, object contents, and addresses to the virtual tables, wherein the virtual table addresses are used to access, during run-time, the virtual member function addresses stored in the virtual tables such that dynamic binding of function code to the objects is achieved, and wherein said debug information comprises said virtual table addresses and virtual table address locations, the debugger method comprising the steps of:

(a) generating a debug lookup table, said debug lookup table comprising entries for said virtual tables, wherein said entries comprise object data type identification fields, object offset fields, and virtual table address fields;

(b) accurately determining said object data types in response to a request to do so from the user; and (c) accurately and completely determining said object contents in response to a request to do so from the user;

wherein step (b) comprises the steps of:

(1) reading said virtual table addresses in said objects by using pointers which address said objects;

(2) accessing said debug lookup table and reading data type identification information in said data type identification fields by matching said virtual table addresses read from said objects to said virtual table addresses stored in said debug lookup table, wherein said data type identification information identifies said object data types; and (3) using said data type identification information to process user requests.

23. The method of claim 22, wherein said step for accurately and completely determining said object contents comprises the steps of:

(a) reading virtual table addresses in said objects by using pointers which address said objects;

(b) accessing said debug lookup table and reading pointer object offset values in said object offset fields by matching said virtual table addresses read from said objects to said virtual table addresses stored in said debug lookup table;

(c) using said pointer object offset values to calculate object starting addresses; and (d) using said object starting addresses to display and modify said object contents.

* * * * *

UNITED STATES PATENT AND TRADEMARK OFFICE
CERTIFICATE OF CORRECTION

PATENT NO.   : 5,361,351
DATED        : November 1, 1994
INVENTOR(S)  : Lenkov et al.

It is certified that error appears in the above-identified patent and that said Letters Patent is hereby corrected as shown below:

Column 16,
Line 62, delete "typeof(" and insert therefor -- typeof() --
Line 63, delete ")"
Line 64, delete "typeof( )" and insert therefor -- typeof() --

Column 17,
Line 44, after "code;" begin a new paragraph

Column 18,
Line 36, delete "field" and insert therefor -- fields --

Column 20,
Line 29, delete "dam" and insert therefor -- data --

Column 21,
Line 4, delete "typeof( )" and insert therefor -- typeof() --

Signed and Sealed this

Twenty-eighth Day of January, 2003

JAMES E. ROGAN
*Director of the United States Patent and Trademark Office*